(12) United States Patent
Li et al.

(10) Patent No.: US 12,115,661 B2
(45) Date of Patent: Oct. 15, 2024

(54) SELF-MOVING ROBOT

(71) Applicant: SHENZHEN SILVER STAR INTELLIGENT GROUP CO., LTD., Shenzhen (CN)

(72) Inventors: Jianya Li, Shenzhen (CN); Wenhai Deng, Shenzhen (CN)

(73) Assignee: SHENZHEN SILVER STAR INTELLIGENT GROUP CO., LTD., Shenzhen (CN)

( * ) Notice: Subject to any disclaimer, the term of this patent is extended or adjusted under 35 U.S.C. 154(b) by 381 days.

(21) Appl. No.: 17/699,420

(22) Filed: Mar. 21, 2022

(65) Prior Publication Data

US 2022/0305679 A1  Sep. 29, 2022

(30) Foreign Application Priority Data

Mar. 25, 2021 (CN) .......................... 202110320819.6

(51) Int. Cl.
*B25J 5/00* (2006.01)
*B25J 9/16* (2006.01)
*B25J 19/02* (2006.01)

(52) U.S. Cl.
CPC ............. *B25J 19/022* (2013.01); *B25J 5/007* (2013.01); *B25J 9/1697* (2013.01)

(58) Field of Classification Search
None
See application file for complete search history.

(56) References Cited

U.S. PATENT DOCUMENTS

| 11,199,853 | B1 * | 12/2021 | Afrouzi ................. B25J 13/006 |
| 11,548,159 | B1 * | 1/2023 | Ebrahimi Afrouzi ..... G06T 7/13 |
| 2008/0133052 | A1 * | 6/2008 | Jones ...................... B25J 5/007 455/39 |
| 2019/0184742 | A1 * | 6/2019 | Kwa ...................... B62D 21/18 |
| 2020/0101594 | A1 * | 4/2020 | Chen ...................... F16H 55/17 |

\* cited by examiner

*Primary Examiner* — Truc M Do
(74) *Attorney, Agent, or Firm* — Samson G. Yu

(57) ABSTRACT

A self-moving robot includes a chassis, a laser radar and a front wheel assembly. The laser radar is fixedly connected to one side of the chassis. The front wheel assembly is rotatably supported on another side of the chassis that faces away from the laser radar. An orthographic projection of the front wheel assembly on the chassis at least partially overlaps with an orthographic projection of the laser radar on the chassis.

19 Claims, 5 Drawing Sheets

SELF-MOVING ROBOT

CROSS-REFERENCE TO RELATED APPLICATIONS

The present disclosure claims priority of Chinese Patent Application No. 202110320819.6, filed on Mar. 25, 2021, titled "SELF-MOVING ROBOT", the contents of which are incorporated herein by reference.

TECHNICAL FIELD

The present disclosure relates to the field of robots, and in particularly, relates to a self-moving robot.

BACKGROUND

At present, self-moving robots may be used in household service, and the self-moving robots may be sweeping robots, mopping robots or washing robots or the like. Usually, the self-moving robot is equipped with a laser radar on the top cover for navigation, but usually the laser radar needs to pass through the hole on the top cover, and the laser radar lacks the effective support of the top cover itself, which leads to the limited bonding strength between the laser radar and the top cover. Thus, the laser radar is likely to be shaken or damaged due to excessive external pressure.

SUMMARY

An embodiment of the present disclosure provides a self-moving robot. The self-moving robot includes a chassis, a laser radar and a front wheel assembly. The laser radar is fixedly connected to one side of the chassis. The front wheel assembly is rotatably supported on another side of the chassis that faces away from the laser radar. An orthographic projection of the front wheel assembly on the chassis at least partially overlaps with an orthographic projection of the laser radar on the chassis.

BRIEF DESCRIPTION OF THE DRAWINGS

One or more embodiments are illustrated by pictures in the corresponding attached drawings, which do not constitute limitation on the embodiments. Elements with the same reference numerals in the attached drawings are shown as similar elements, and the pictures in the attached drawings do not constitute scale limitation unless otherwise specifically stated.

DETAILED DESCRIPTION

In order to make purposes, technical solutions and advantages of the present disclosure more clear, the present disclosure will be further described in detail below with reference to the attached drawings and embodiments. It shall be appreciated that, the specific embodiments described here are only used to explain the present disclosure, and are not used to limit the present disclosure. Based on the embodiments in the present disclosure, all other embodiments obtained by those of ordinary skill in the art without creative labor are within the scope claimed in the present disclosure.

It shall be noted that, features in embodiments of the present disclosure may be combined with each other without conflict, and all of them are within the scope claimed in the present disclosure. In addition, although functional modules are divided in the schematic view of the device and logical sequences are shown in the flowchart diagram, in some cases, steps shown or described may be executed in a manner different from the module division in the device or in a sequence different from that in the flowchart diagram. Furthermore, words "first", "second" and "third" used in the present disclosure do not limit the data and execution order, but only distinguish the same or similar items with basically the same functions and effects.

Figure 1:
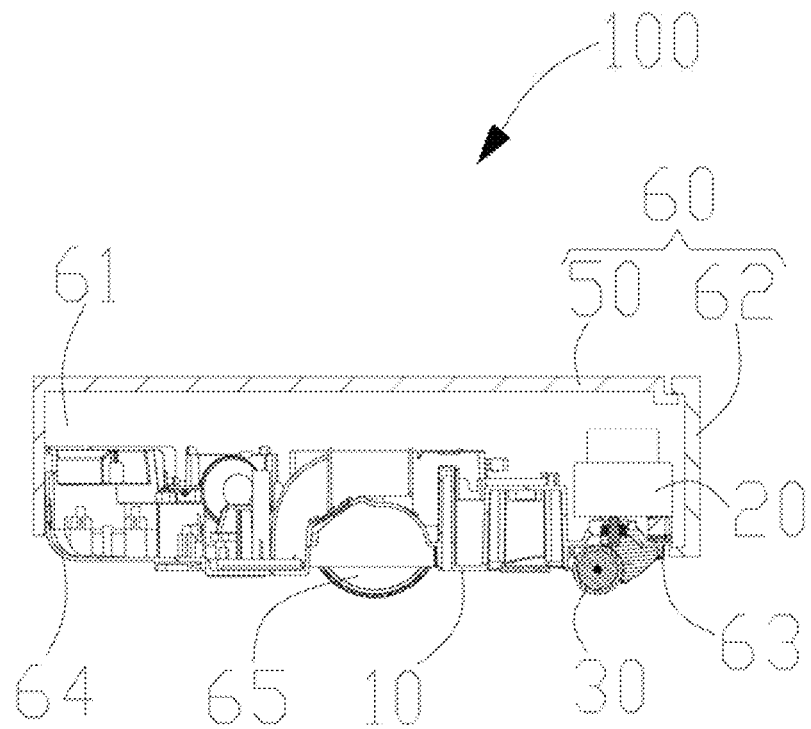
FIG. 1 is a schematic view of the longitudinal cross-sectional structure of a self-moving robot provided by an embodiment of the present disclosure, the self-moving robot including a front wheel assembly, a laser radar and a chassis.
Figure 2:
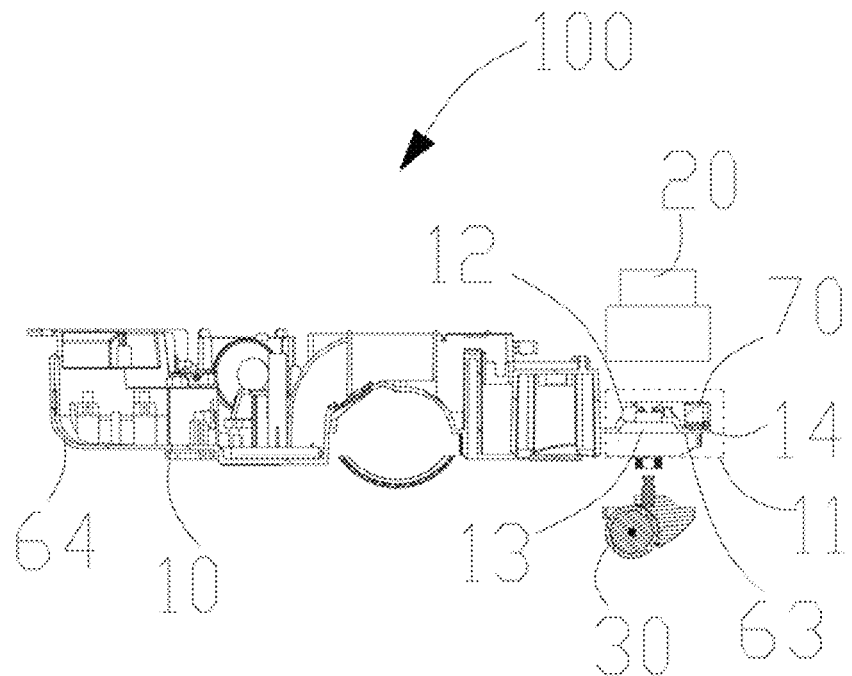
FIG. 2 is an exploded schematic view of part of the self-moving robot of FIG. 1.

Referring to FIG. 1 and FIG. 2, an embodiment of the present disclosure provides a self-moving robot 100, the self-moving robot 100 includes a chassis 10, a laser radar 20 and a front wheel assembly 30. The laser radar 20 is fixedly connected to one side of the chassis 10. The front wheel assembly 30 is rotatably supported on another side of the chassis 10 that faces away from the laser radar 20, and the orthographic projection of the front wheel assembly 30 on the chassis 10 at least partially overlaps with the orthographic projection of the laser radar 20 on the chassis 10.

In the self-moving robot 100, the laser radar 20 is fixedly connected to one side of the chassis 10, the front wheel assembly 30 is rotatably supported on one side of the chassis 10 that faces away from the laser radar 20, and the orthographic projection of the front wheel assembly 30 on the chassis 10 at least partially overlaps with the orthographic projection of the laser radar 20 on the chassis 10, such that the laser radar 20 can be adequately supported by the chassis 10 and the front wheel assembly 30 and become stable, thereby preventing the laser radar 20 from being shaken or damaged due to excessive external pressure.

It shall be appreciated that, the self-moving robot 100 may be a cleaning robot, and for example, the self-moving robot 100 may be any of a sweeping robot, a mopping robot, a washing robot and a window cleaning robot. The self-moving robot 100 may also be one of other types of robots, and for example, the self-moving robot 100 may be any of a transport robot and a patrol robot, which is not limited here. The embodiment of the present disclosure is illustrated by taking the case where the self-moving robot 100 is a cleaning robot as an example.

In this embodiment, the self-moving robot 100 may include a chassis 10 and an upper cover assembly 60, and the upper cover assembly 60 is detachably installed on the chassis 10 to protect various functional components inside the self-moving robot 100 from being damaged by violent impact or inadvertently dripping liquid during use. The chassis 10 and/or the upper cover assembly 60 are configured to carry and support various functional components. In an optional embodiment, the body of the self-moving robot 100 may also have other design configurations. For example, the body may be an integrally formed structure or a left-right separated structure, and the material, shape and structure of the body are not limited in the embodiment of the present disclosure.

The chassis 10 and the upper cover assembly 60 cooperatively defines an inner cavity 61 therebetween. The inner cavity 61 is configured to provide an arrangement area 15 (see FIG. 4) for internal devices of the self-moving robot 100. The self-moving robot 100 includes a dust collecting box, a vacuum pump, a battery, a main circuit board, a ground detection sensor, a collision detection sensor and a wall sensor and the like, all of which are arranged in the inner cavity 61. The upper cover assembly 60 includes a middle shell 50 and a collision side plate 62 movably connected with the middle shell 50. The middle shell 50 is the main part of the upper cover assembly 60, and buttons may be positioned on the middle shell 50. The middle shell 50 and the collision side plate 62 are jointly covered on the chassis 10, and the middle shell 50 is fixedly connected with the chassis 10 by means of screw connection and the like. The collision side plate 62 is capable of moving relative to the chassis 10 and the middle shell 50, the self-moving robot 100 further includes an elastic member that elastically connects the chassis 10 and the collision side plate 62, and the elastic member is capable of providing elastic support force for the collision side plate 62. When the collision side plate 62 hits an obstacle, it contracts relative to the middle shell 50, and then the collision side plate 62 extends out relative to the middle shell 50 under the elasticity of the elastic member. The collision side plate 62 may be any of an arc shape, a ring shape, a u-shape and the like, and the shape may be set according to actual needs, which is not limited here.

The self-moving robot 100 includes a moving mechanism, the moving mechanism is installed at the bottom of the chassis 10 and extends out of the chassis 10, so as to drive the main body of the self-moving robot 100 to move. The moving mechanism includes a pair of driving wheels 65 oppositely arranged and the front wheel assembly 30. The pair of driving wheels 65 and the front wheel assembly 30 are distributed on the chassis 10 in a triangle. The pair of driving wheels 65 may actively drive the main body of the self-moving robot 100 to move, and the front wheel assembly 30 supports the self-moving robot 100 and moves with the main body of the self-moving robot 100.

The laser radar 20 is installed in the inner cavity 61 between the upper cover assembly 60 and the chassis 10, such that the laser radar 20 does not need to protrude from the upper cover assembly 60, which is beneficial to prevent the laser radar 20 from being impacted or blocked by obstacles outside.

The laser radar 20 may be a mechanical laser radar or a solid-state laser radar, and may be selected as required. In this embodiment, the laser radar 20 is a mechanical laser radar, and the laser radar 20 is a D-TOF radar, which uses the time-of-flight principle to measure the distance. The laser radar 20 includes a housing assembly fixedly connected with the main body of the robot, and a driving device fixedly connected with the housing assembly, the driving device is capable of driving a ranging assembly to rotate, and the ranging assembly includes a laser transmitter and a single-photon detection chip. The plane where the emitting light path of the laser transmitter and the receiving light path of the single-photon detection chip lie is perpendicular to the rotation axis direction of the ranging assembly, and the emitting light path of the laser transmitter is parallel to the receiving light path of the single-photon detection chip. In other embodiments, the laser radar 20 may also be a triangular ranging radar.

The laser radar 20 may scan the environment where the self-moving robot 100 is located, and the self-moving robot 100 may build an environment map model according to the scan signal of the laser radar 20, and then the self-moving robot 100 may be navigated according to the environment map model.

Figure 3:
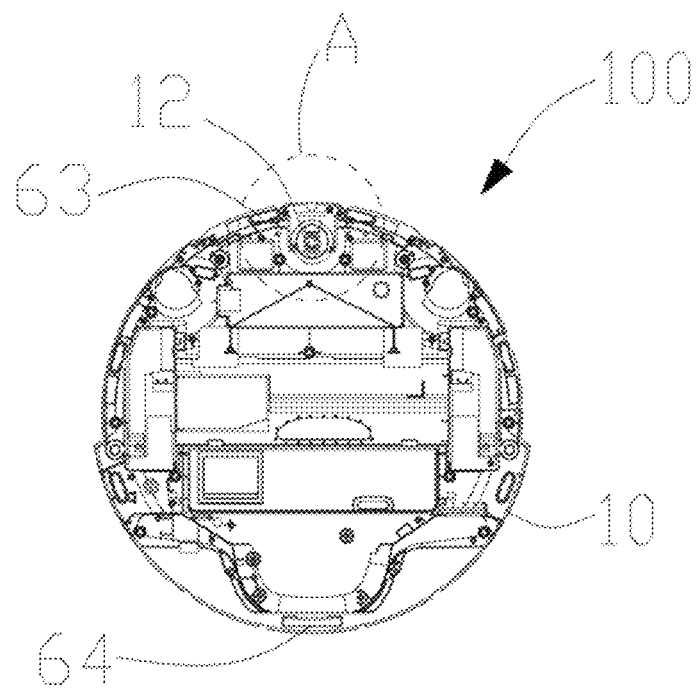
FIG. 3 is a schematic top view of the self-moving robot of FIG. 1, wherein the front wheel assembly and the laser radar are both omitted.

Referring to FIG. 1 and FIG. 3, the chassis 10 includes a front end 63 and a rear end 64 opposite to the front end 63. The collision side plate 62 of the self-moving robot 100 is movably connected to the front end 63 of the chassis 10. The laser radar 20 is fixed at the position of the chassis 10 close to the front end 63 and the collision side plate 62. A proper interval is kept between the laser radar 20 and the collision side plate 62, so as to reserve adequate space for the collision side plate 62 to move and prevent the collision side plate 62 from colliding with and damaging the laser radar 20. The collision side plate 62 includes a light-transmitting area which allows the laser radar 20 to send and receive light. The front wheel assembly 30 is connected to the position of the chassis 10 close to the front end 63 and the collision side plate 62. The front wheel assembly 30 is supported at the bottom of the chassis 10, that is, the front wheel assembly 30 and the laser radar 20 are connected to the opposite two sides of the chassis 10 respectively. By making the orthographic projection of the front wheel assembly 30 on the chassis 10 at least partially overlap with the orthographic projection of the laser radar 20 on the chassis 10, the front wheel assembly 30 and the laser radar 20 occupy roughly the same area of the chassis 10, and the structure is relatively compact, which is beneficial for reducing the occupation of the arrangement area 15 of the chassis 10.

Referring to FIG. 1 and FIG. 2, further, the chassis 10 includes a bearing structure 11 located between the laser radar 20 and the front wheel assembly 30. A convex structure 12 is formed at one side of the bearing structure 11 that is close to the laser radar 20, a wheel groove 13 is defined at one side of the bearing structure 11 that is close to the front wheel assembly 30, the wheel groove 13 is positioned corresponding to the convex structure 12, the convex structure 12 supports the bottom of the laser radar 20, and the front wheel assembly 30 is partially accommodated in the wheel groove 13 and partially extends out of the wheel groove 13.

In this embodiment, the bearing structure 11 is configured to bear the weight of the laser radar 20, and the laser radar 20 may be fixedly connected with the bearing structure 11 by means of screws, buckles, insertion or the like. The convex structure 12 is convexly arranged on one side of the chassis 10 that faces away from the front wheel assembly 30, and the convex structure 12 provides enough space for defining the wheel groove 13, such that the front wheel assembly 30 may be partially accommodated in the wheel groove 13. The convex structure 12 supports the bottom of the laser radar 20, that is, the convex structure 12 and the laser radar 20 are stacked in the height direction of the self-moving robot 100.

Figure 4:
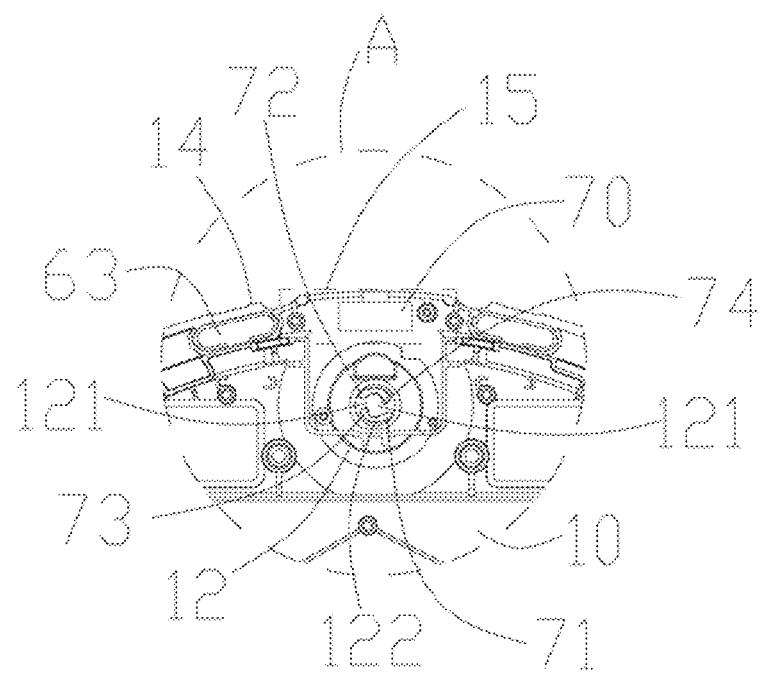
FIG. 4 is an enlarged schematic view of an area A in FIG. 3.

Referring to FIG. 2, FIG. 3 and FIG. 4, the chassis 10 includes a front edge 14, the convex structure 12 and the front edge 14 are arranged at an interval, the arrangement area 15 is arranged between the convex structure 12 and the front edge 14, and the orthographic projection of the laser radar 20 on the chassis 10 at least partially falls within the arrangement area 15. The self-moving robot 100 further includes a recharging alignment device 70, and the recharging alignment device 70 is installed in the arrangement area 15. The recharging alignment device 70 is configured to receive recharging guidance signals, such that the self-moving robot 100 approaches the charging device according to the recharging guidance signals, and finally the self-moving robot 100 may dock with the charging device to charge. One side of the recharging alignment device 70 facing away from the chassis 10 is flush with one side of the convex structure 12 facing away from the chassis 10, such that the recharging alignment device 70 and the convex structure 12 form a platform for supporting the bottom of the laser radar 20, and the recharging alignment device 70 and the convex structure 12 both contact with the bottom of the laser radar 20. Thus, the assembling structure of the convex structure 12, the recharging alignment device 70 and the laser radar 20 is compact, which is conducive to save the arrangement area.

Figure 5:
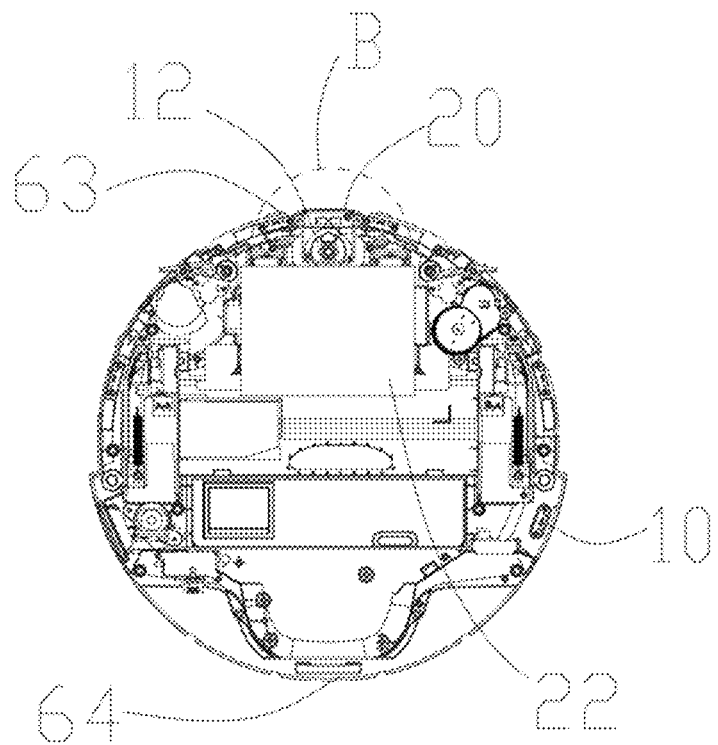
FIG. 5 is another schematic top view of the self-moving robot of FIG. 1, wherein the front wheel assembly and the laser radar are both shown.
Figure 6:
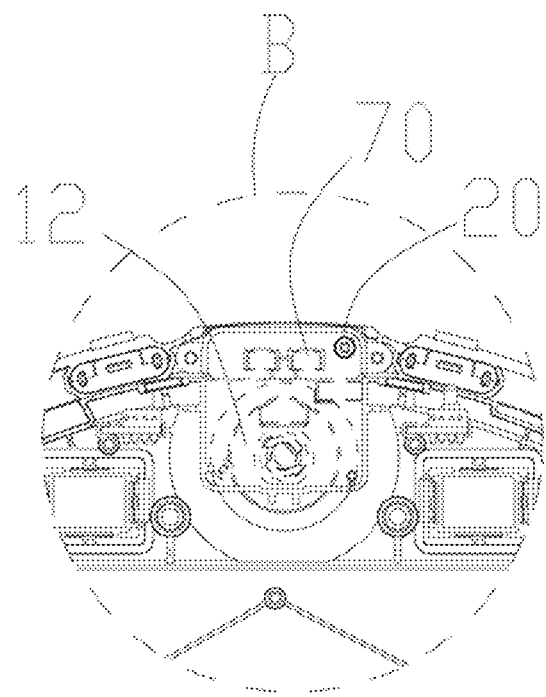
FIG. 6 is an enlarged schematic view of an area B in FIG. 5.

Referring to FIG. 1, FIG. 5 and FIG. 6, the self-moving robot 100 further includes a main circuit board 22, the main circuit board 22 is fixed on the chassis 10, the main circuit board 22 is located between the front end 63 and the rear end 64, and the main circuit board 22 is closer to the front end 63 relative to the back end 64. The main circuit board 22 electrically connects the laser radar 20 and the pair of driving wheels 65. The main circuit board 22 is arranged adjacent to the laser radar 20. The orthographic projection of the front wheel assembly 30 on the chassis 10 at least partially overlaps with the orthographic projection of the laser radar 20 on the chassis 10, this avoids the convex structure 12 from moving backward and interfering with the main circuit board 22.

Figure 7:
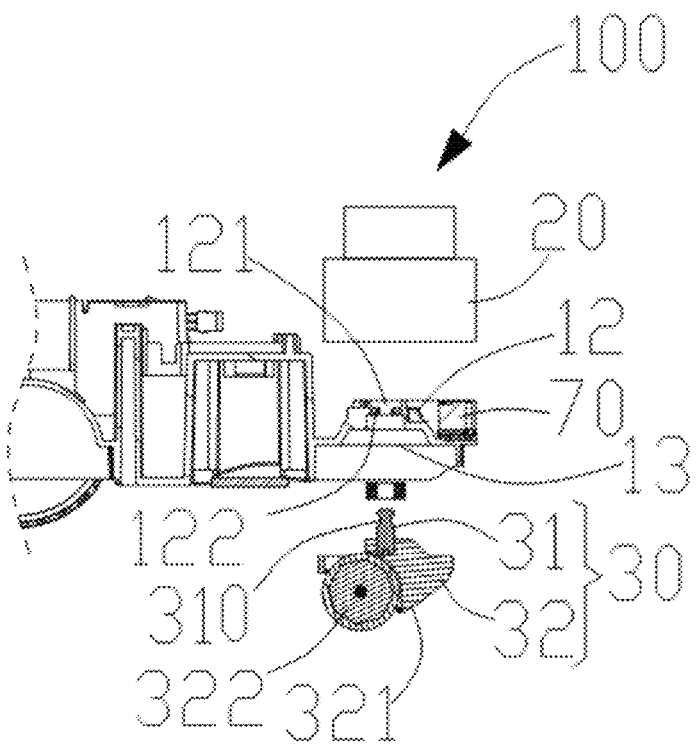
FIG. 7 is a schematic view of part of the self-moving robot of FIG. 2, wherein the laser radar, the front wheel assembly and the front part of the chassis are shown.
Figure 8:
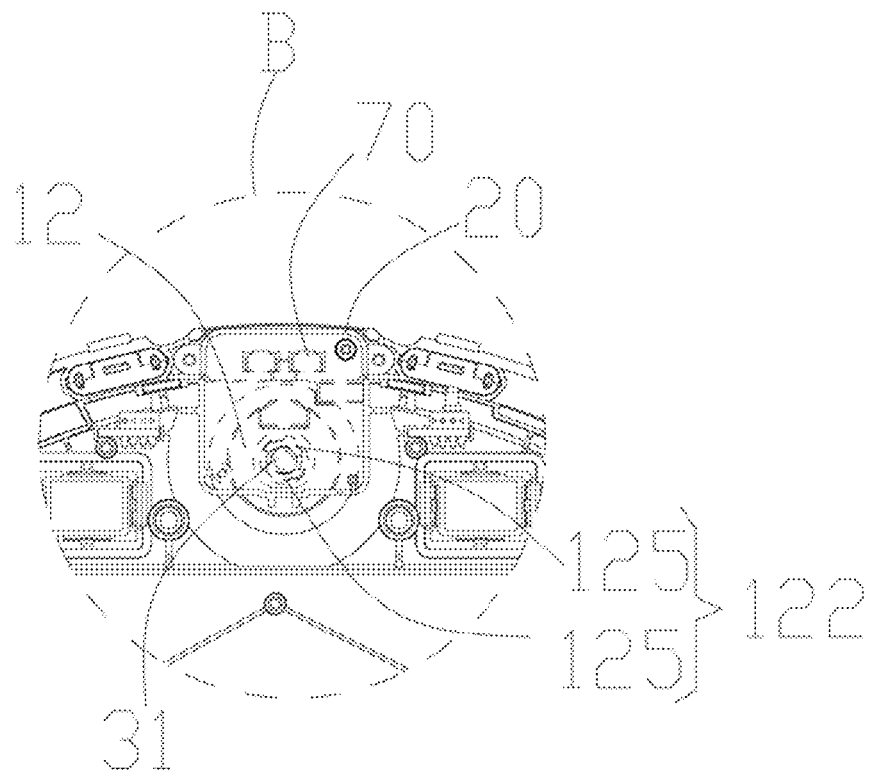
FIG. 8 is another enlarged schematic view of the area B in FIG. 5.

Referring to FIG. 7 and FIG. 8, further, the convex structure 12 defines a shaft hole 121 communicated with the wheel groove 13, the convex structure 12 includes a clamping structure 122 arranged in the shaft hole 121, the front wheel assembly 30 includes a rotating shaft 31 and a front wheel body 32 fixedly connected with the rotating shaft 31, one end of the rotating shaft 31 extends into the shaft hole 121 and is detachably connected with the clamping structure 122, and the front wheel body 32 is fixed to one end of the rotating shaft 31 that is close to the wheel groove 13.

In this embodiment, the shaft hole 121 may or may not penetrate through the convex structure 12. As the clamping structure 122 is arranged in the shaft hole 121, the clamping structure 122 does not additionally increase the height dimension of the convex structure 12, thereby avoiding the convex structure 12 from interfering with the laser radar 20 due to excessive height, further preventing the convex structure 12 from having to be moved backward to avoid the laser radar 20 due to excessive height.

The front wheel body 32 includes a front wheel bracket 321 fixedly connected to the rotating shaft 31 and a roller 322 rotatably connected to the front wheel bracket 321. The front wheel body 32 is rotatably engaged with the shaft hole 121 through the rotating shaft 31, and the rotating axis direction of the rotating shaft 31 is perpendicular to the rotating axis direction of the roller 322, wherein the axial direction of the shaft hole 121 is arranged along the vertical direction, the rotating axis direction of the rotating shaft 31 is arranged along the vertical direction, and the rotating axis direction of the roller 322 is arranged along the horizontal direction.

In some embodiments, the clamping structure 122 includes two elastic arms 125 arranged oppositely, the two elastic arms 125 are located on the same horizontal plane, the two elastic arms 125 are elastically clamped at the opposite two sides of the rotating shaft 31 respectively. The two elastic arms 125 are perpendicular to the axis direction of the rotating shaft 31, so as to clamp the rotating shaft 31. In this way, the rotating shaft 31 is capable of rotating relative to the chassis 10. At the same time, the above clamping action may limit the separation of the rotating shaft 31 from the shaft hole 121, and meanwhile allow the rotating shaft 31 to be detached from the clamping structure 122 against the above clamping force.

Referring to FIG. 4, FIG. 7 and FIG. 8, an annular groove 310 is defined in one end of the rotating shaft 31 extending into the shaft hole 121, the annular groove extends along the circumferential sidewall of the rotating shaft 31, the two elastic arms 125 are all arc-shaped, the two elastic arms 125 are positioned around the circumferential side of the rotating shaft 31, and the two elastic arms 125 are respectively clamped at the circumferential side of the annular groove. The two elastic arms 125 include a first elastic arm and a second elastic arm. The first elastic arm includes a first connecting end 71 and a first free end 73 opposite to the first connecting end 71. The second elastic arm includes a second connecting end 72 and a second free end 74 opposite to the second connecting end 72. The first connecting end 71 is connected to the inner sidewall of the shaft hole 121, and the first free end 73 is movably arranged perpendicular to the axial direction of the shaft hole 121. The second connecting end 72 is connected to the inner sidewall of the shaft hole 121, the second free end 74 is movably arranged perpendicular to the axial direction of the shaft hole 121, the second connecting end 72 is arranged adjacent to the first free end 73, and the second connecting end 72 and the first free end 73 are arranged at a variable interval. The first connecting end 71 is arranged adjacent to the second free end 74, and the first connecting end 71 and the second free end 74 are arranged at a variable interval. The first free end 73 and the second free end 74 are capable of cooperatively clamping the rotating shaft 31 under the elastic action, and the rotating shaft 31 are also capable of being separated from the first free end 73 and the second free end 74 against the elastic action of the first free end 73 and the second free end 74.

Figure 9:
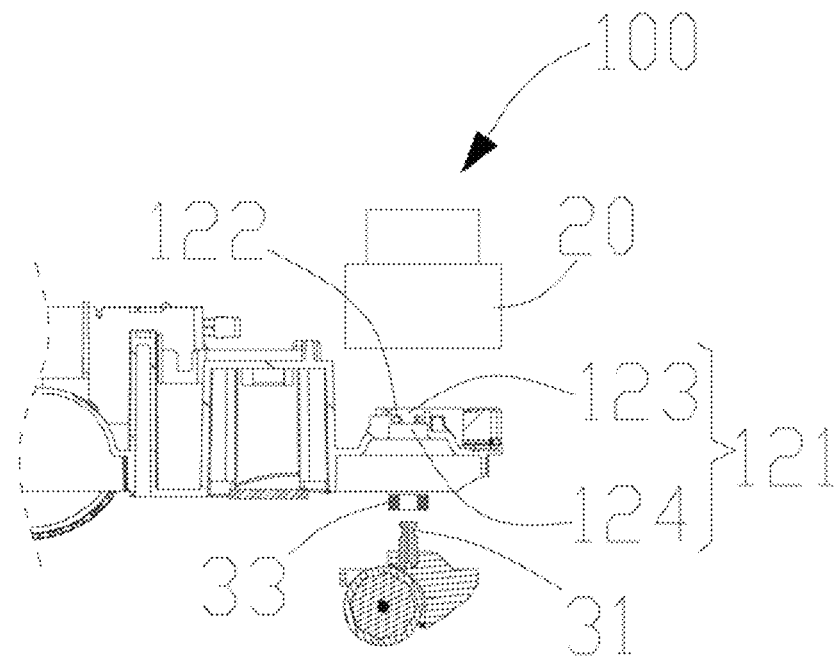
FIG. 9 is another enlarged schematic view of part of the self-moving robot of FIG. 2, wherein the laser radar, the front wheel assembly and the front part of the chassis are shown.

Referring to FIG. 9, further, the shaft hole 121 includes a first part 123 and a second part 124 adjacent to and communicated with the first part 123, the first part 123 is arranged close to the laser radar 20, the second part 124 is arranged close to the front wheel assembly 30, the diameter of the second part 124 is larger than the diameter of the first part 123, the clamping structure 122 is arranged in the first part 123, the front wheel assembly 30 further includes a bearing 33, and the bearing 33 is installed in the second part 124 and is rotatably engaged with the rotating shaft 31.

In this embodiment, the first part 123 and the second part 124 are arranged side by side along the axial direction of the shaft hole 121. The first part 123 and the second part 124 are both circular in shape. The outer ring of the bearing 33 is fixedly matched with the circumferential side of the second part 124, the inner ring of the bearing 33 is fixedly matched with the rotating shaft 31, and the outer ring of the bearing 33 is capable of rotating relative to the inner ring of the bearing 33. The bearing 33 may be any of a deep groove ball bearing, a thrust ball bearing, a self-aligning roller bearing and a self-aligning ball bearing, and it may be selected by those skilled in the art according to their own needs, which is not limited here.

Referring to FIG. 1 and FIG. 9, further, one end of the shaft hole 121 away from the wheel groove 13 penetrates through the convex structure 12, and the distance between one end of the rotating shaft 31 extending into the shaft hole 121 and the bottom of the laser radar 20 is less than a preset distance threshold.

In this embodiment, in order to further reduce the height dimension of the convex structure 12, the shaft hole 121 penetrates through the convex structure 12, such that the distance between one end of the rotating shaft 31 extending into the shaft hole 121 and the bottom of the laser radar 20 is greatly reduced and the stacking height of the laser radar 20 and the convex structure 12 is reduced, thereby preventing the case where the laser radar 20 cannot be arranged in the inner cavity 61 of the self-moving robot 100 reasonably due to the excessively high position thereof. Since the convex structure 12 does not need to add a structure for closing the shaft hole 121, the height dimension of the convex structure 12 is reduced, which is beneficial for reducing the stacking height of the laser radar 20 and the convex structure 12. The preset distance threshold may be 1 mm to 5 mm.

Figure 10:
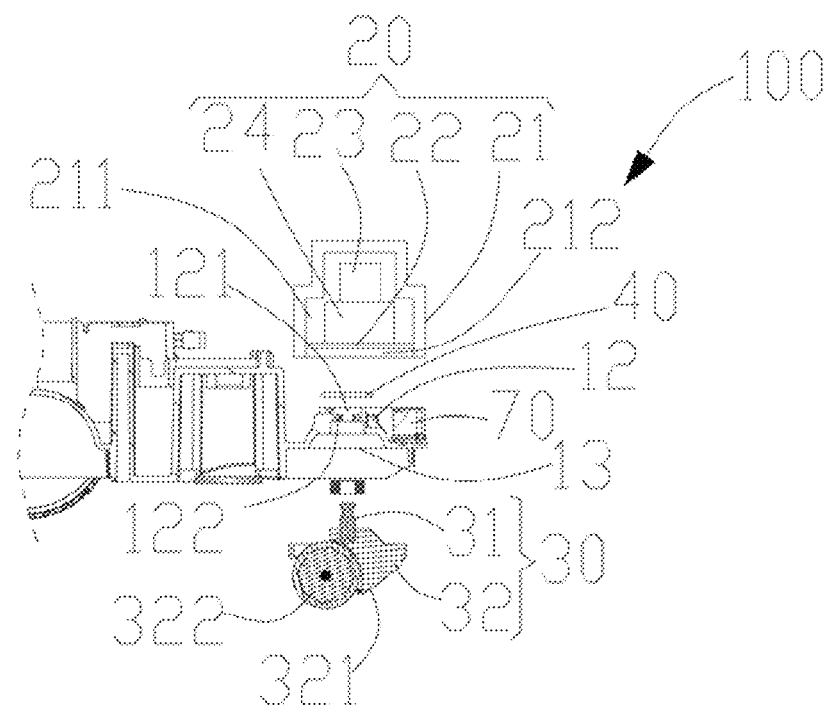
FIG. 10 is still another enlarged schematic view of part of the self-moving robot of FIG. 2, wherein the laser radar, the front wheel assembly and the front part of the chassis are shown.

Referring to FIG. 10, further, the self-moving robot 100 further includes a waterproof piece 40, the waterproof piece 40 seals one end of the shaft hole 121 close to the bottom of the laser radar 20.

In this embodiment, because the shaft hole 121 penetrates through the convex structure 12, the shaft hole 121 is connected with the wheel groove 13 and the inner cavity 61 of the self-moving robot 100, and one end of the shaft hole 121 away from the wheel groove 13 faces the bottom of the laser radar 20. Since the water vapor in the surrounding environment of the self-moving robot 100 may enter the inner cavity 61 of the self-moving robot 100 through the shaft hole 121, and the bottom of the laser radar 20 is easily invaded by the water vapor entering from the shaft hole 121 at first, it is likely to cause oxidation corrosion or short circuit of the electrical components of the laser radar 20. In order to overcome the problem caused by the shaft hole 121 penetrating through the convex structure 12, the waterproof piece 40 seals one end of the shaft hole 121 close to the bottom of the laser radar 20, which may prevent external water vapor from invading the laser radar 20 through the shaft hole 121. The waterproof piece 40 may be any of EVA (ethylene-vinyl acetate copolymer), silica gel, sealing cotton and the like, and those skilled in the art may choose suitable materials on their own according to actual needs.

Referring to FIG. 10, further speaking, the laser radar 20 includes a housing 21, a circuit board 22, a ranging assembly 23 and a driving device 24. The housing 21 defines a receiving cavity 211, the housing 21 is fixed to the bearing structure 11, the receiving cavity 211 includes an open end 212 facing the shaft hole 121 and the waterproof piece 40, the circuit board 22 is fixed to the open end 212 and attached to the waterproof piece 40, and the ranging assembly 23 and the driving device 24 are stacked in turn on one side of the circuit board 22 facing away from the waterproof piece 40 and accommodated in the receiving cavity. By making the receiving cavity 211 have the open end 212 facing the shaft hole 121 and the waterproof piece 40, it is convenient to install the circuit board 22, the ranging assembly 23 and the driving device 24 in the receiving cavity 211 through the open end 212.

In this embodiment, the housing 21 includes a base and a light-transmitting cover fixedly connected to the base, and the base and the light-transmitting cover cooperatively define the receiving cavity 211. The bottom of the laser radar 20 is located at one side of the base away from the light-transmitting cover, and the top of the laser radar 20 is located at one side of the light-transmitting cover away from the base. The base of the housing 21 may be fixedly connected with the chassis 10 by screw connection or the like. The base of the housing 21 includes the open end 212, and the open end 212 is located at the side of the base away from the light-transmitting cover. The waterproof piece 40 is sheet-shaped, and by fixing the circuit board 22 to the open end 212 and attaching the circuit board 22 to the waterproof piece 40, it may be ensured that the waterproof piece 40 keeps sealing the shaft hole 121. The circuit board 22 may be fixedly connected to the base by screw connection, buckle connection, glue bonding or thermal welding or the like. The circuit board 22 is electrically connected with the ranging assembly 23 and the driving device 24, the circuit board 22 may control the driving device 24 to drive the ranging assembly 23 to rotate, and control the ranging assembly 23 to send and receive environmental scanning signals through the light-transmitting cover to scan the surrounding environment in a preset scanning angle range, wherein the preset scanning angle range may be greater than or equal to 180 degrees.

Finally, it shall be noted that the above embodiments are only used to illustrate the technical solutions of the present disclosure, but not to limit the present disclosure. Under the thought of the present disclosure, the technical features in the above embodiments or different embodiments may also be combined, the steps may be implemented in any order, and there are many other variations in different aspects of the present disclosure as described above, which are not provided in details for brevity. Although the present disclosure has been described in detail with reference to the foregoing embodiments, those of ordinary skill in the art shall appreciate that, it is still possible to modify the technical solutions recorded in the foregoing embodiments or to substitute for some of the technical features equivalently. However, these modifications or substitutions do not make the essence of the corresponding technical solutions deviate from the scope of the technical solutions of the embodiments of the present disclosure.

What is claimed is:

1. A self-moving robot, comprising a chassis, a laser radar and a front wheel assembly, the laser radar fixedly connected to one side of the chassis, the front wheel assembly rotatably supported on another side of the chassis that faces away from the laser radar, and an orthographic projection of the front wheel assembly on the chassis at least partially overlapping with an orthographic projection of the laser radar on the chassis, wherein the chassis comprises a bearing structure located between the laser radar and the front wheel assembly, the bearing structure comprises a convex structure, the convex structure is located at one side of the bearing structure close to the laser radar, the bearing structure defines a wheel groove, the wheel groove is located at one side of the bearing structure close to the front wheel assembly, the wheel groove is positioned corresponding to the convex structure, the convex structure supports a bottom of the laser radar, and the front wheel assembly is partially accommodated in the wheel groove and partially extends out of the wheel groove.

2. The self-moving robot of claim 1, wherein the convex structure defines a shaft hole communicated with the wheel groove, the convex structure comprises a clamping structure arranged in the shaft hole, the front wheel assembly comprises a rotating shaft and a front wheel body fixedly connected with the rotating shaft, one end of the rotating shaft extends into the shaft hole and is detachably connected with the clamping structure, and the front wheel body is fixed to another end of the rotating shaft.

3. The self-moving robot of claim 2, wherein the shaft hole comprises a first part and a second part adjacent to and communicated with the first part, the first part is arranged close to the laser radar, the second part is arranged close to the front wheel assembly, a diameter of the second part is larger than a diameter of the first part, the clamping structure is arranged in the first part, the front wheel assembly further comprises a bearing, and the bearing is installed in the second part and is rotatably engaged with the rotating shaft.

4. The self-moving robot of claim 2, wherein one end of the shaft hole away from the wheel groove penetrates through the convex structure, and a distance between the end of the rotating shaft extending into the shaft hole and the bottom of the laser radar is less than a preset distance threshold.

5. The self-moving robot of claim 4, wherein the preset distance threshold is 1 mm to 5 mm.

6. The self-moving robot of claim 4, further comprising a waterproof piece, and the waterproof piece sealing one end of the shaft hole close to the bottom of the laser radar.

7. The self-moving robot of claim 6, wherein the laser radar comprises a housing, a circuit board, a ranging assembly and a driving device, the housing defines a receiving cavity, the housing is fixed to the bearing structure, the receiving cavity comprises an open end facing the shaft hole and the waterproof piece, the circuit board is fixed to the open end and attached to the waterproof piece, and the ranging assembly and the driving device are stacked in turn on one side of the circuit board facing away from the waterproof piece and are both accommodated in the receiving cavity.

8. The self-moving robot of claim 2, wherein the clamping structure comprises two elastic arms arranged opposite to each other, and the two elastic arms are elastically clamped at opposite two sides of the rotating shaft respectively.

9. The self-moving robot of claim 8, wherein the two elastic arms comprises a first elastic arm and a second elastic arm, the first elastic arm comprises a first connecting end and a first free end opposite to the first connecting end, the second elastic arm comprises a second connecting end and a second free end opposite to the second connecting end, the first connecting end is connected to an inner sidewall of the shaft hole, the second connecting end is connected to the inner sidewall of the shaft hole, and the first free end and the second free end are capable of cooperatively clamping the rotating shaft.

10. The self-moving robot of claim 9, wherein the first free end is movably arranged perpendicular to an axial direction of the shaft hole, and the second free end is movably arranged perpendicular to the axial direction of the shaft hole.

11. The self-moving robot of claim 9, wherein the second connecting end is arranged adjacent to the first free end, the second connecting end and the first free end are arranged at a variable interval, the first connecting end is arranged adjacent to the second free end, and the first connecting end and the second free end are arranged at a variable interval.

12. The self-moving robot of claim 8, wherein the end of the rotating shaft extending into the shaft hole defines an annular groove, the annular groove extends along a circumferential sidewall of the rotating shaft, the two elastic arms are all arc-shaped, and the two elastic arms are respectively clamped at a circumferential side of the annular groove.

13. The self-moving robot of claim 1, wherein the chassis comprises a front edge, the convex structure and the front edge are arranged at an interval, an arrangement area is located between the convex structure and the front edge, the orthographic projection of the laser radar on the chassis at least partially falls within the arrangement area, the self-moving robot further comprises a recharging alignment device, and the recharging alignment device is installed in the arrangement area.

14. The self-moving robot of claim 13, wherein one side of the recharging alignment device facing away from the chassis is flush with one side of the convex structure facing away from the chassis, and the recharging alignment device and the convex structure form a platform supporting the bottom of the laser radar.

15. The self-moving robot of claim 13, wherein the laser radar is fixed at a position of the chassis close to the front end, and the front wheel assembly is connected to a position of the chassis close to the front end.

16. The self-moving robot of claim 2, wherein the clamping structure comprises two elastic arms arranged opposite to each other, the two elastic arms are located on the same horizontal plane, the two elastic arms are perpendicular to an axial direction of the rotating shaft, and the two elastic arms are elastically clamped at opposite two sides of the rotating shaft respectively.

17. The self-moving robot of claim 2, wherein the front wheel body comprises a front wheel bracket and a roller, the front wheel bracket is fixedly connected to the rotating shaft, the roller is rotatably connected to the front wheel bracket, and a rotating axis direction of the rotating shaft is perpendicular to a rotating axis direction of the roller.

18. The self-moving robot of claim 17, wherein an axial direction of the shaft hole is arranged along a vertical direction, the rotating axis direction of the rotating shaft is arranged along the vertical direction, and the rotating axis direction of the roller is arranged along a horizontal direction.

19. The self-moving robot of claim 1, further comprising a middle shell, the middle shell fixedly connected with the chassis and covering the chassis, the middle shell and the chassis cooperatively defining an inner cavity therebetween, and the laser radar installed in the inner cavity.

\* \* \* \* \*